United States Patent [19]

Daniel

[11] 4,019,125
[45] Apr. 19, 1977

[54] WELL LOGGING PAD DEVICES HAVING SELECTIVE DIFFERENTIAL RELIEF

[75] Inventor: Wilbur Lee Daniel, Houston, Tex.
[73] Assignee: Dresser Industries, Inc., Dallas, Tex.
[22] Filed: Oct. 17, 1975
[21] Appl. No.: 623,868
[52] U.S. Cl. .................. 324/1; 73/152; 324/10
[51] Int. Cl.² ............ G01V 3/18; E21B 49/00
[58] Field of Search ........... 324/1, 10; 250/268; 73/152, 155; 166/65, 100

[56] References Cited
UNITED STATES PATENTS

| | | | |
|---|---|---|---|
| 2,747,402 | 5/1956 | Doll | 324/10 X |
| 2,983,586 | 5/1961 | Blanchard | 324/10 UX |
| 3,116,449 | 12/1963 | Vogel | 324/10 X |
| 3,177,938 | 4/1965 | Roussin | 324/10 UX |
| 3,209,588 | 10/1965 | Terry | 73/152 |
| 3,377,550 | 4/1968 | Osoba et al. | 324/10 |
| 3,579,098 | 5/1971 | Mougne | 324/10 |

Primary Examiner—Gerard R. Strecker
Attorney, Agent, or Firm—William E. Johnson, Jr.

[57] ABSTRACT

A well logging instrument comprises a focus section having a focus upper guard, a center electrode and lower focus guard. The bottom section of the instrument includes a pad device having electrodes on its borehole wall-engaging surface and adapted to be urged against the borehole wall and also having one or more pressure relief devices, for example, spring-loaded check valves, located therein to reduce differential pressure which might otherwise build up between the surface of the pad and the borehole wall. The remote electrode of the focus portion of the instrument is the armor surrounding the logging cable. The lower focus guard serves a dual function in that it is also the mini-focus remote electrode. Means are provided for measuring the potential between the focus guard and the cable armor and also between the microguard and the lower focus guard, both measurements then being sent up the logging cable to the surface electronics.

6 Claims, 7 Drawing Figures

WELL LOGGING PAD DEVICES HAVING SELECTIVE DIFFERENTIAL RELIEF

RELATED APPLICATION

This application is an improvement upon U.S. Pat. application Ser. No. 616,967, filed Sept. 26, 1975, by Jorg August Angehrn for "WELL LOGGING PAD DEVICES HAVING DIFFERENTIAL PRESSURE RELIEF".

BACKGROUND OF THE INVENTION

This invention relates generally to an apparatus for the logging of earth boreholes and specifically to a well logging device having one or more pads adapted to be urged against the borehole wall.

It is well known in the art of well logging to utilize apparatus having an elongated body adapted to traverse an earth borehole and also having one or more pad devices extendible from the main body into engagement with the borehole wall. When using such devices, pressure frequently builds up between the face of the measuring pad, or the back-up pad, and the borehole wall which can seriously damage the measuring device. Those in the art, while recognizing that such a differential pressure exists, have concentrated their efforts on controlling the force with which the pad is pushed up against the wall. Not infrequently, this has resulted in inferior measurements made with the well logging instrument.

Furthermore, it is known in the above-noted related application to provide one or more pressure relief holes in such pad devices. However, in such devices, the face of the pad is in continuous contact with the borehole fluid.

It is therefore the primary object of the present invention to provide a new and improved apparatus for logging earth boreholes with apparatus of the type using pad devices which are provided with means selectively operable for equalizing the pressure across the pad; and It is also an object of the present invention to provide a new and improved well logging apparatus having one or more pad assemblies in which such pads have been perforated in a manner which tends to minimize the effect of the holes on the focusing properties of the electrode arrangement.

The objects of the invention are accomplished, generally, by a well logging apparatus having one or more pad assemblies thereon adapted for urging the same against the borehole wall, such pads being characterized by one or more selectively opening pressure relief holes therein which tend to eliminate the buildup of a differential pressure across the pad.

These and other objects, features and advantages of the present invention will be more readily appreciated from a reading of the following detailed specification and drawing, in which.

Figures 1, 3:
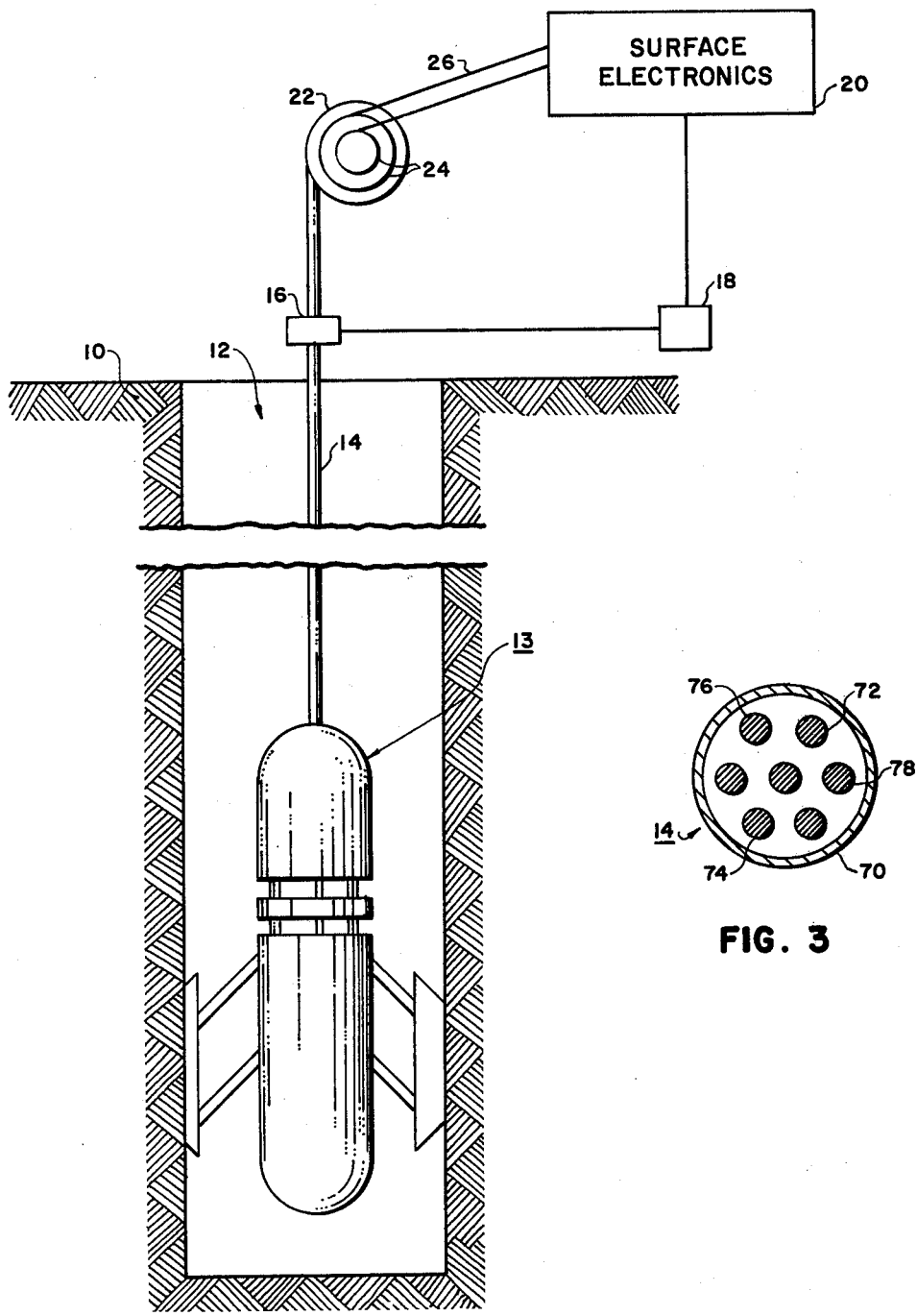
FIG. 1 is a schematic illustration of a well logging operation showing the logging instrument supported in a borehole from the surface equipment.
FIG. 3 illustrates in cross section the logging cable used with the invention.

Referring now to the drawing in more detail, FIG. 1 illustrates a portion of the earth's surface 10 into which a borehole 12 has been drilled. Disposed within the borehole and adapted to be raised and lowered therein is a borehole instrument 13 supported by a cable 14 from the earth's surface. The apparatus on the surface of the earth consists of a measuring wheel 16 over which the cable 14 passes and a drum 22 on which the cable is wound, or from which it is unwound, when the instrument 13 is caused to traverse the borehole 12. The conductors 26 are connected to the conductors within the cable 14 by means of the sliprings 24 and brushes (not illustrated) carried on one end of the drum 22. The conductors 26 lead into th surface electronics section 20. The surface electronics 20 includes the necessary conventional amplifying and recording equipment for recording a pair of signals from the subsurface instrument 13 which has been transmitted over the cable 14. Such a recorder might, for example, have a pair of recording heads for the two focused section signals. The measuring wheel 16 is also connected to drive the transmission means 18 which causes the recorder (not illustrated) within the surface electronics 20 to record the subsurface measurements as a function of depth within the borehole in the conventional manner.

Figure 2:
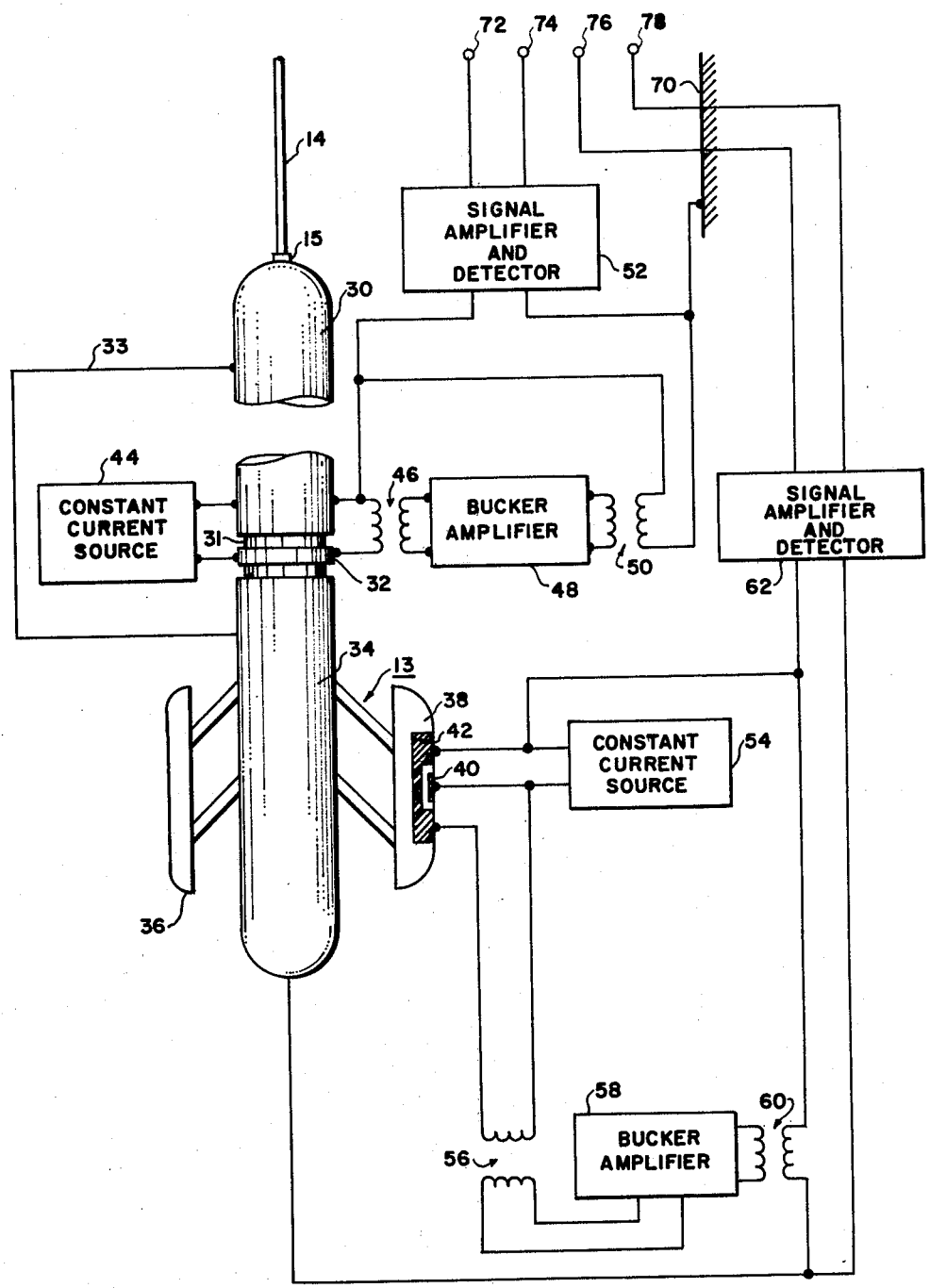
FIG. 2 illustrates schematically a borehole instrument according to the invention.

Referring now to FIG. 2, there is illustrated schematically the borehole example, 13 according to the invention and the electronics (partly in block diagram) found therein. The supporting cable 14, being armorplated to provide a remote electrode as is explained hereinafter, is coupled into the top section of the instrument 13 through an insulator 15 so that the armorplate of the cable 14 will not necessarily be maintained at the same electrical potential as that of the upper guard electrode 30 of the borehole instrument. The upper guard electrode 30 is approximately 7 feet 2 inches in length. Immediately beneath the upper guard electrode 30 is an insulator section 31, for examle, comprised of ceramic, and then a center electrode 32. The center electrode 32 is approximately 6 inches in height. Although different heights can be used for the center electrode, it has been shown that with such dimensions, approximately 75 percent of the resistivity measurement covers a diameter of 12 feet around the borehole. Likewise, 90 percent covers a diameter of 26 feet.

A lower guard section 34 forms the bottom portion of the instrument 13 and is separated from the center electrode 32 by a similar insulator as insulator 31 which separates the center electrode from the upper guard section 30. The upper guard section 30 is maintained at the same electrical potential as that of the lower guard section 34, for example, as by the conductor 33.

It should be appreciated that while the insulator sections 31 which separate the upper guard 30 from the center electrode 32 and the center electrode 32 from the lower guard sections 34 are shown, for ease of illustration, as being recessed from the periphery of the instrument 13, the sides of the insulators can coincide, or even extend from, the sides of the instrument 13 if desired.

A constant current source 44 is connected to the center electrode 32. Although the constant current source could provide either an AC or DC current to the center electrode 32, a preferred embodiment contemplates that a low frequency alternating current is applied to the center electrode. Also connected between the center electrode 32 and the upper guard electrode 30 is an error transformer 46 which continuously monitors and senses any potential difference between the center electrode 32 and the guard electrodes 30 and 34. Any difference in potential is amplified by the bucker amplifier 48 and coupled through the transformer 50 to supply a signal back to the guard electrodes 30 and 34, thus maintaining the guard electrodes at substantially the same electrical potential as the center electrode 32. Also connected to the guard electrode 30 is a signal amplifier and detector section 52 which provides an indication of the electrical potential of the guard electrode 30 with respect to the armor-plate 70 of the cable 14. The DC voltage output of the signal amplifier and detector section 52 is coupled through the cable 14 by conductors 72 and 74 for transmission to the earth's surface.

In the operation of the focused logging section thus far described, the electrical potential on each of the upper and lower guard sections, being sections 30 and 34, respectively, is maintained at substantially the same as that of the center electrode 32. With such a configuration, the constant current source 44 causes the center electrode 32 to pass or emit a current beam approximately 6 inches in height about 11 feet of more into the adjacent earth formations. Some distance further into the formations, the current beam swings upward into the armor-plated shield 70 of the cable 14 and the resistivity of the formation causes there to be a difference in the electrical potential between the guard electrode 30 and the remote point 70 on the cable 14.

The lower guard section 34 of the instrument 13 is approximately 7 feet 3 inches in length. A borehole wall-engaging pad member 38 is mechanically connected with the guard electrode 34. Also connected to the lower gurad member 34 is a backup shoe 36 which engages another side of the borehole wall, thus causing the pad member 38 to continuously contact the borehole wall while the instrument 13 traverses the borehole. It should be appreciated that the backup shoe 36 and the pad 38 can be supported from the guard member 34 by spring members, hydraulic members or by any other means known in the art for causing each of them to engage the borehole wall.

Figure 4:
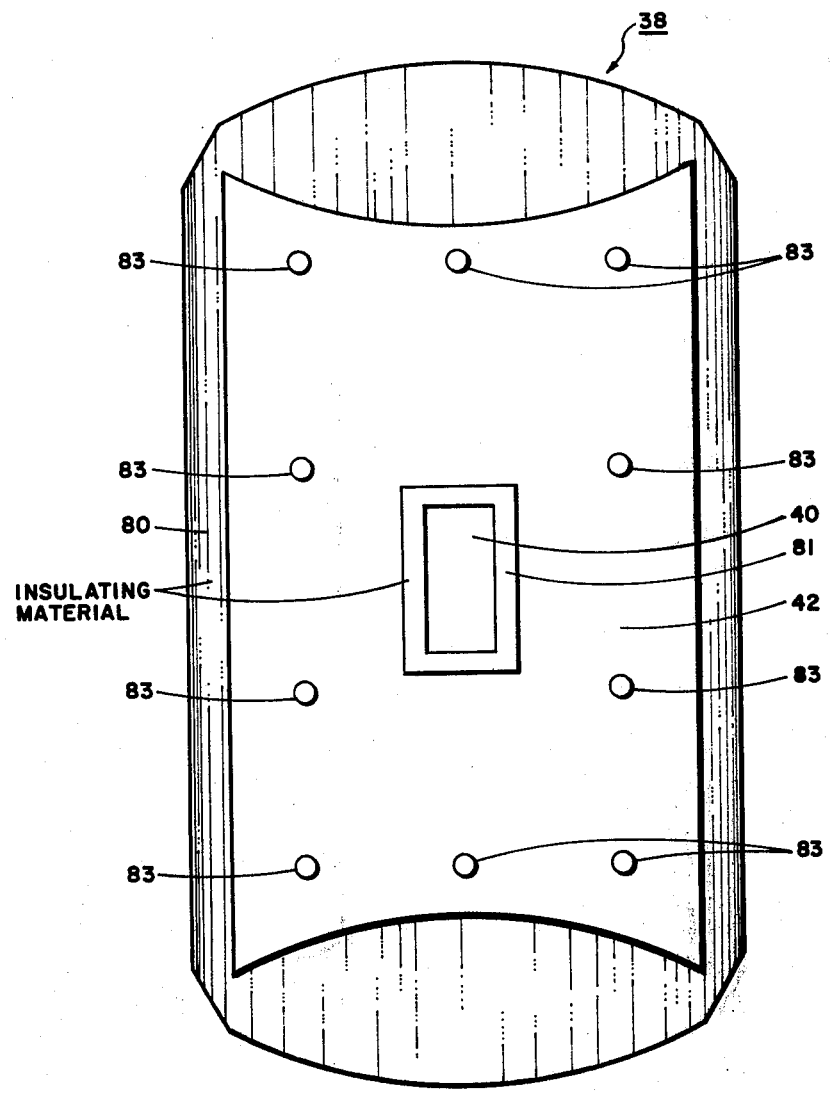
FIG. 4 is a plan schematic view of a pad constructed in accordance with the present invention.
Figure 5:
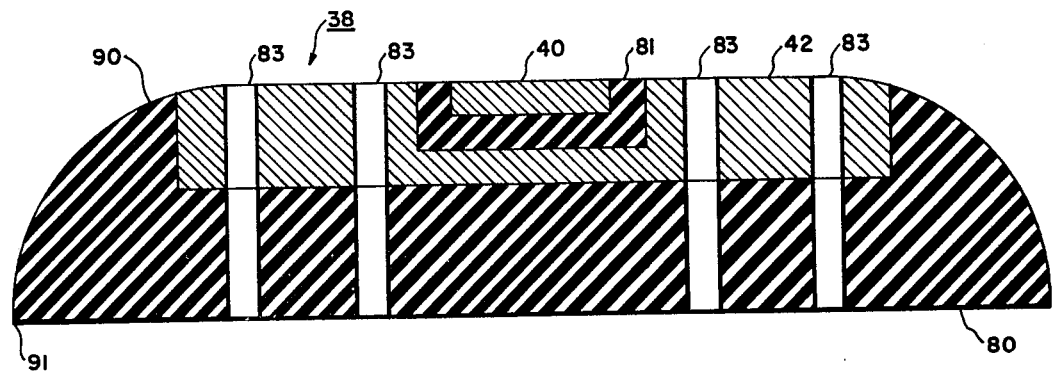
FIG. 5 is an elevational view, in cross section, of a pad constructed in accordance with the present invention.

The pad member 38, shown in greater detail in FIGS. 4 and 5, being fabricated for the most part from an insulating material, for example, of hard rubber, contains one center electrode 40 around which are one or more guard electrodes 42. A constant current source 54 causes a focused beam of current to be passed or emitted from the center electrode 40. Through the use of the error-sensing transformer 56, the bucking current amplifier 58 and transformer 60, the electrical potential on the guard ring 42 is maintained substantially the same as that on the center electrode 40, in an analogous manner as that described above with respect to the other focused section. The guard electrode 42 is also connected to the signal amplifier and detector section 62 which measures the electrical potential between the lower guard electrode 34 and the guard ring 42 of the minifocused pad device. The conductors 76 and 78 are coupled out of the signal amplifier and detector section 62 through the cable 14 for transmission of the DC signals to the earth's surface.

FIG. 3 illustrates a typical seven-conductor logging cable having an armor-plated shield 70. As illustrated in FIG. 3, the DC signals from the signal amplifier detector section 52 are coupled through the conductors 72 and 74, whereas the DC signals from the signal amplifier and detector section 62 are coupled through the conductors 76 and 78, the signals on conductors 76 and 78 being indicative of the electrical potential detected by the minifocused (shallow investigation) section, and the signals on the conductors 72 and 74 being indicative of the electrical potential detected by the focused (deep investigation) section.

Referring now to FIG. 4, the pad 38 as illustrated in FIGS. 1 and 2 is shown in greater detail. The pad 38 includes an area 80 around the periphery of the well bore wall-engaging surface which is formed of an insulating material, for example, hard rubber. A rectangular-shaped electrode 40 is formed in the center of the well bore wall-engaging surface of pad 38 and is formed of any suitable electrode material. The center electrode 40 is surrounded by a thin ring-shaped layer of insulating material 81 around its periphery, for example, fabricated from hard rubber. A guard electrode 42 surrounds the insulating material 81 and covers a large portion of the wall-engaging surface of the pad 38. A plurality of holes 83 are drilled or otherwise formed through the electrode 42 and the insulating material 80, as is best illustrated in FIG. 5.

Referring now to FIG. 5, it can be seen that the pad 38 has a front or wall-engaging surface 90 and a back surface 91 which would be nearer to the main instrument housing 13 as illustrated in FIG. 2. As further illustrated in FIG. 5, the plurality of holes 83 are formed through the electrode 42 and also through the insulating material 80. Although not illustrated in FIG. 5, each of the holes 83 has a spring-loaded ball valve therein as illustrated in FIG. 6.

In forming the holes 83, for example, by drilling or perforating the pad 38, those skilled in the art will recognize that some experimentation may be necessary in the fabrication of the pad in order to minimize the effect of the holes on the focusing properties of the electrode arrangement. Thus, the specific size and location of the pressure relief holes may depend upon the arrangement of the electrodes, the internal components within the pad and other geometric considerations.

Figure 6:
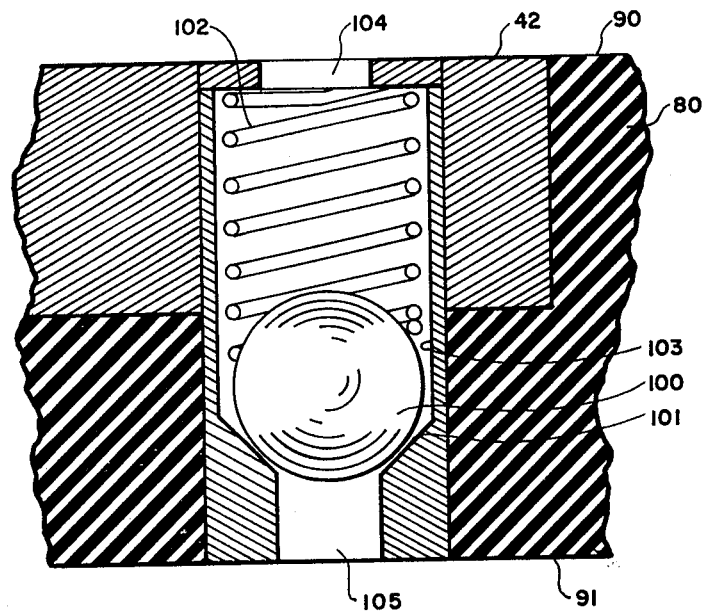
FIG. 6 is an expanded, elevational view, in cross section, of a portion of the pad structure of FIG. 5.

Referring now to FIG. 6, there is illustrated in greater detail a portion of the pad illustrated in FIG. 5 and also illustrating a spring-loaded ball valve which is inserted into each of the holes 83. The ball valve has a ball 100 which is forced against the seat 101 by a spring 102. The ball valve is located within a cylindrical housing 103 which is sized to fit the internal dimensions of the hole 83 and which has an opening 104 on the outside face 90 of the pad and an opening 105 on the face 91 of the pad. The spring member 102 need only be strong enough to hold the ball 100 against the seat 101 because as soon as differential pressure begins to build across the pad from face 91 to 90, the ball 100 will be pushed off the seat 101, borehole fluid will pass through the opening 105 into the interior of the ball valve housing and out the opening 104 against the borehole wall to equalize the pressure across the pad. It should be appreciated that, although not illustrated, each of the holes 83 illustrated in FIG. 5 has one of the spring-loaded check valves as illustrated in FIG. 6 therein.

In the operation of the pad illustrated in FIGS. 5 and 6, it should be appreciated that as the pad 38 is urged against the borehole wall, any pressure that might have otherwise been built up across the pad, that is, between the surfaces 90 and 91, will be relieved because the pressure entering the opening 105 will force the ball 100 off the seat 101 and thus establish fluid communication between the faces 90 and 91 of the pad member.

Figure 7:
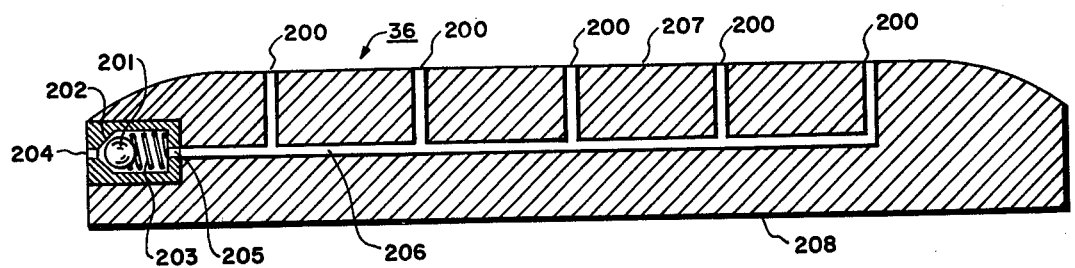
FIG. 7 is an elevational view, in cross section, of a pad constructed in accordance with an alternative embodiment of the present invention.

FIG. 7 illustrates an alternative embodiment of the present invention wherein the backup pad shoe 36, also shown in FIGS. 1 and 2, is illustrated as having a spring-loaded check valve communicating between one port 204 on one end of the pad 36 and a plurality of ports 200 on the face 207 of the pad which normally engages the borehole wall. The spring-loaded check valve includes a ball 201, a valve seat 202 and a spring 203. The valve housing has an inlet port 204 in communication with the borehole fluid and a port 205 in fluid communication with the channel 206 running along the length of the pad and to which each of the ports 200 is in fluid communication.

In the operation of the apparatus illustrated in FIG. 7, it should be appreciated that there are two means of selectively equalizing the pressure across the pad member 36 between the faces 207 and 208. First, whenever the pressure is sufficient to force the ball 201 off the seat 202, the borehole fluid will pass into the inlet port 204, out the opening 205 into the channel 206 and thus to the outlet ports 200 to equalize the pressure between the faces 207 and 208. If the pressure does not cause the valve to open, the operator of the hoist cable, by pulling up on the cable 14 illustrated in FIG. 1, causes additional borehole fluid pressure to be generated against the ball 201 which thus causes the ball 201 to leave the seat 202 and thereby open the valve to relieve the pressure.

Thus it should be appreciated that there have been illustrated and described herein apparatus which allow pressure which would have otherwise been built up across a pad assembly to be relieved. Although the preferred embodiment contemplates the use of a plurality of pressure relief devices, those skilled in the art will recognize that a single relief device will provide some degree of relief from the pressure built up. Likewise, geometric placements of such pressure relief devices other than those illustrated and described herein will be obvious to those skilled in the art from a reading of the foregoing detailed specification. Furthermore, although the preferred embodiment has been illustrated and described with respect to a well logging instrument using focused logging sections, those skilled in the art will recognize that other types of well logging and perforating apparatus can use one or more pad assemblies built in accordance with the present invention wherein one or more selective pressure relief devices are used in such pads. For example, acoustic, radioactivity, or other such well logging instruments can use pad assemblies built in accordance with the present invention having selective differential pressure relief. Likewise, although the preferred embodiments contemplate that the one or more pressure relief channels are selectively opened by selectively setting the spring tension within the spring-loaded check valves, those skilled in the art will recognize that the channel or channels can contain a valve, or valves, respectively, selectively actuatable from the earth's surface, for example, upon the operator noticing that the pad is stuck against the borehole wall.

The embodiments of the invention in which an exclusive property or privilege is claimed are defined as follows:

1. An apparatus for investigating earth formations traversed by a borehole, comprising:
   an elongated support member adapted for movement through a borehole; and
   an auxiliary pad member connected to said support member and adapted to be urged against the borehole wall, said pad member having first and second surfaces, said first surface having at least one electrode and being adapted to engage the borehole wall, and said pad member having at least one fluid channel between said first and second surfaces and a spring-loaded check valve in said at least one fluid channel responsive to differential pressure between said first and second surfaces for providing differential pressure relief therebetween.

2. The apparatus according to claim 1 wherein said first surface on said pad member includes at least one electrode adapted to engage the borehole wall.

3. The apparatus according to claim 1 wherein said at least one fluid channel comprises a plurality of said channels and each of said channels has a spring-loaded check valve therein.

4. The apparatus according to claim 1 wherein said fluid channel has a plurality of outlet ports on the said first face of said pad and a single inlet port on the second face of said pad.

5. The apparatus according to claim 4 wherein said single inlet is exposed to additional borehole fluid pressure in response to said apparatus being raised in the borehole.

6. An apparatus for investigating earth formations traversed by a borehole, comprising:
   an elongated support member adapted for movement through a borehole; and
   an auxiliary pad member connected to said support member and adapted to be urged against the borehole wall, said pad member having first and second surfaces, said first surface having at least one electrode and being adapted to engage the borehole wall, and said pad member having at least one fluid channel between said first and second surfaces and means within said at least one channel responsive to differential pressure between said first and second surfaces for providing pressure relief between said first and second surfaces.

* * * * *